US 9,298,404 B2
Mar. 29, 2016

(12) United States Patent
Niblett, Jr.

(10) Patent No.: US 9,298,404 B2
(45) Date of Patent: Mar. 29, 2016

(54) DIGITAL PRINTING SYSTEM HAVING OPTIMIZED PAPER USAGE

(75) Inventor: Kenneth Ray Niblett, Jr., Sunnyvale, CA (US)

(73) Assignee: Shutterfly, Inc., Redwood City, CA (US)

(*) Notice: Subject to any disclaimer, the term of this patent is extended or adjusted under 35 U.S.C. 154(b) by 2198 days.

(21) Appl. No.: 12/109,523

(22) Filed: Apr. 25, 2008

(65) Prior Publication Data

US 2009/0268232 A1    Oct. 29, 2009

(51) Int. Cl.
 *H04N 1/00* (2006.01)
 *G06K 15/00* (2006.01)
 *G06F 3/12* (2006.01)

(52) U.S. Cl.
 CPC ............ *G06F 3/1214* (2013.01); *G06F 3/1208* (2013.01); *G06F 3/1262* (2013.01); *G06F 3/1272* (2013.01); *G06F 3/1288* (2013.01)

(58) Field of Classification Search
 CPC . B42P 2261/04; G06F 3/1208; G06F 3/1252; G06F 3/1253; G06F 3/1254; H04N 1/00188; H04N 1/00567
 USPC ....................... 358/1.12–1.15, 1.18
 See application file for complete search history.

(56) References Cited

U.S. PATENT DOCUMENTS

| | | | | |
|---|---|---|---|---|
| 5,398,289 A * | 3/1995 | Rourke | .................. | G06K 15/00 358/1.12 |
| 7,016,068 B1 * | 3/2006 | Gnocato | ............... | G06F 17/211 358/1.12 |
| 7,099,037 B2 * | 8/2006 | Clark | .................... | G06F 3/1219 358/1.13 |
| 7,133,149 B2 | 11/2006 | Keane | | |
| 7,173,772 B2 * | 2/2007 | Masuda | ........................ | 359/696 |
| 7,221,470 B2 * | 5/2007 | Takamine et al. | ............ | 358/1.15 |
| 7,345,783 B2 * | 3/2008 | Suzuki et al. | ................ | 358/1.18 |
| 7,426,058 B2 * | 9/2008 | Suzuki et al. | ................ | 358/1.18 |
| 7,812,998 B2 * | 10/2010 | Miers | ...................... | B42C 19/06 358/1.13 |
| 7,859,709 B2 * | 12/2010 | Mori | ...................... | G06F 17/211 358/1.13 |
| 2002/0135808 A1 * | 9/2002 | Parry | .......................... | 358/1.17 |
| 2003/0081260 A1 * | 5/2003 | Suzuki et al. | ................. | 358/302 |
| 2006/0059427 A1 | 3/2006 | Reid | | |
| 2006/0109516 A1 | 5/2006 | Catalan | | |
| 2006/0112080 A1 * | 5/2006 | Chen | .................... | G11B 27/031 |
| 2006/0114518 A1 | 6/2006 | King | | |

* cited by examiner

*Primary Examiner* — Mohammad Ghayour
*Assistant Examiner* — Jonathan R Beckley
(74) *Attorney, Agent, or Firm* — Xin Wen

(57) ABSTRACT

A method for manufacturing printed page products includes defining a plurality of subbatches each comprising one or more of the pages, creating layouts for the pages in the plurality of subbatches, separating the plurality of subbatches into N groups each comprising a total number of pages equal or less than M, minimizing the difference between the total pages in the N groups and M×N, and printing the layouts of the pages on a stack of sheets each configured to contain layouts for N pages. The layouts of the pages in the stack of sheets are positioned in N columns.

14 Claims, 7 Drawing Sheets

DIGITAL PRINTING SYSTEM HAVING OPTIMIZED PAPER USAGE

BACKGROUND

In recent years, photography has been rapidly transformed from chemical based technologies to digital imaging technologies. Digital images captured by digital cameras can be stored in computers and viewed on electronic display devices. A user can upload digital images to a central network location provided by an image service provider such as Shutterfly, Inc. at www.shutterfly.com. The user can store, organize, manage, edit, enhance, and share digital images at the central network location using a web browser or software tools provided by the service provider. A user can also design and order printed products from the image service provider. The printed products can include image prints, photo books, photo calendars, photo greeting cards, holiday cards, and posters using content provided by users. The printed products can be created for the user or as photo gifts for others. The order of printed product from each user typically has a short run. A manufacturer typically produces printed products from a larger number of users at any time. A need therefore exist to manufacture the printed products efficiently in time and cost while minimizing paper waste.

SUMMARY

In one aspect, the present application relates to a method for manufacturing printed page products. The method includes defining a plurality of subbatches each comprising one or more of the pages, creating layouts for the pages in the plurality of subbatches, separating the plurality of subbatches into N groups each comprising a total number of pages equal or less than M, minimizing the difference between the total pages in the N groups and M×N, and printing the layouts of the pages on a stack of sheets each configured to contain layouts for N pages. The layouts of the pages in the stack of sheets are positioned in N columns.

In another aspect, the present application relates to a computer-readable storage medium storing a computer program comprising instructions to perform a method for manufacturing printed page products. The method includes defining a plurality of subbatches each comprising one or more of the pages, creating layouts for the pages in the plurality of subbatches, separating the plurality of subbatches into N groups each comprising a total number of pages equal or less than M, minimizing the difference between the total pages in the N groups and M×N; and printing the layouts of the pages on a stack of sheets each configured to contain layouts for N pages. The layouts of the pages in the stack of sheets are positioned in N columns.

In another aspect, the present application relates to a method for manufacturing printed page products. The method includes defining a plurality of subbatches each comprising one or more of the pages; creating layouts for the pages in the plurality of subbatches; separating the plurality of subbatches into N groups each comprising a total number of pages equal or less than M; successively assigning the plurality of subbatches into the N groups; and determining an emptiest group, a second emptiest group, a fullest group, or a second fullest group in the N group. The emptiest group includes the least number of pages in its associated subbatches. The second emptiest group includes the second least number of pages in its associated subbatches. The fullest group includes the most number of pages in its associated subbatches. The second fullest group includes the second most number of pages in its associated subbatches. The method also includes determining an unassigned subbatch in the plurality of subbatches, wherein the unassigned subbatch is not yet assigned to any of the N groups. The method includes assigning one of the unassigned subbatch into the emptiest group, the second emptiest group, the fullest group, or the second fullest group to minimize the difference between the total pages in the N groups and M×N; and printing the layouts of the pages on a stack of sheets each configured to contain layouts for N pages. The layouts of the pages in the stack of sheets are positioned in N columns.

Implementations of the system may include one or more of the following. The layouts in at least one of the N columns have substantially the same lateral dimensions. The method can further include determining which of the N groups has the highest page number; and assigning the highest page number as maximum stack number. The method can further include inserting blank pages into one or more of the N groups to make the pages in the N groups all equal to the maximum stack number. The method can further include: if pages in the one of the plurality of subbatches are more than M, breaking one of the plurality of subbatches into two or more subbatches before the step of separating. The step of creating layouts can include receiving content from one or more user(s) and incorporating the content in the layouts. The content can include text and image. The method can further include receiving the content over a computer network. The step of printing can include printing the layouts of the pages on the stack of sheets using a digital printer or a digital press. N can be selected from the group consisting of two, three, four, five, and six. M can be bigger than 10. The step of minimizing can include sequencing the plurality of subbatches according to numbers of pages in the associated subbatches. The step of minimizing can include sequencing the plurality of subbatches in an ascending order or a descending order for the numbers of pages in the associated subbatches. The step of minimizing can include separating the plurality of subbatches into the N groups using an algorithm selected from a group consisting of First Fit, Best Fit, Worst Fit, and Almost Worst Fit. The step of minimizing can include separating the plurality of subbatches into the N groups using two or more algorithms selected from a group consisting of First Fit, Best Fit, Worst Fit, and Almost Worst Fit; and selecting the two or more algorithms to minimizing the difference between the total pages in the N groups and M×N. The step of minimizing can include successively assigning the plurality of subbatches into the N groups. The step of successively assigning can include determining an emptiest group in the N group, wherein the emptiest group includes the least number of pages in its associated subbatches; determining an unassigned subbatch in the plurality of subbatches, wherein the unassigned subbatch is not yet assigned to any of the N groups; and assigning one of the unassigned subbatch into the emptiest group. The step of successively assigning can include: determining a second emptiest group in the N group, wherein the second emptiest group includes the second least number of pages in its associated subbatches; determining an unassigned subbatch in the plurality of subbatches, wherein the unassigned subbatch is not yet assigned to any of the N groups; and assigning one of the unassigned subbatch into the second emptiest group. The step of successively assigning can include: determining a fullest group in the N group, wherein the fullest group includes the most number of pages in its associated subbatches; determining an unassigned subbatch in the plurality of subbatches, wherein the unassigned subbatch is not yet assigned to any of the N groups; and assigning one of the unassigned subbatch into the fullest group. The method can further include cutting the stack of sheets to N stacks each comprising pages associated with the plurality of subbatches.

Embodiments may include one or more of the following advantages. The disclosed systems and methods can produce printed pages for personalized printing products at high throughput and low paper waste. The disclosed systems and methods are compatible with a wide range of printed products with different order sizes, which require different number printed sheets or run length. The disclosed systems and methods can be implemented using computer equipment, which enables automated manufacturing process.

Although the invention has been particularly shown and described with reference to multiple embodiments, it will be understood by persons skilled in the relevant art that various changes in form and details can be made therein without departing from the spirit and scope of the invention.

DETAILED DESCRIPTION

Figure 1:
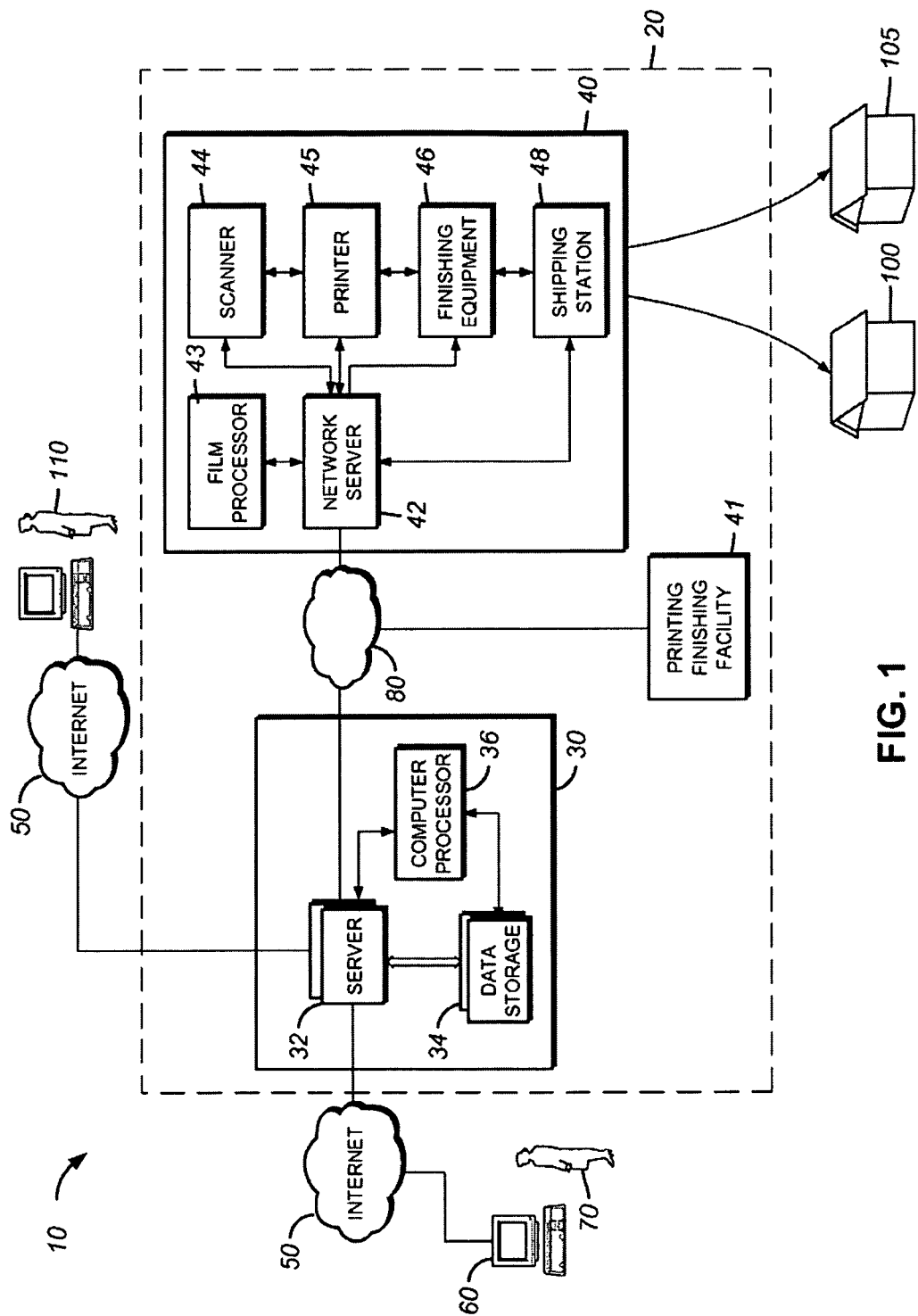
FIG. 1 is a block diagram of a system for producing personalized image-based products.

FIG. 1 shows a block diagram of a system 10 for producing personalized image-based products. An online printing system 20 can be established by an image service provider to provide image services and products on a wide area network such as the Internet 50. The online printing system 20 can include a data center 30, one or more printing and finishing facilities 40 and 41, and a computer network 80 that can facilitate the communications between the data center 30 and the finishing facilities 40 and 41.

In the present specification, the term "personalized" is used in personalized content, personalized messages, personalized images, and personalized designs that can be incorporated in the personalized products. The term "personalized" refers to the information that is specific to the recipient, the user, the gift product, or the intended occasion. The content of personalization can be provided by a user or selected by the user from a library of content provided by the image-server provided. The content provided can include stock images and content licensed from a third party. The term "personalized information" can also be referred to as "individualized information" or "customized information". Examples of personalized image-based products may include personalized photo greeting cards, photo prints, photo books, photo T-shirt, and photo, mugs etc. The personalized image-based products can include users' photos, personalized text, and personalized designs.

The term "photo book" refers to books that include one or more pages and at least one image on a book page. A photo books can include a photo albums, a scrapbook, a photo calendar book, or a photo snapbook, etc. The photo book in the disclosed system can include personalized image and text content provided by a user or by a third party. A "photo-book kit" in the disclosed system refers to a photo book comprising personalized content as described above, as well as one or more book accessories such as a slip case for a book, a book insert such as a bookmark, and a dust jacket. The "photo-book kit" in the disclosed system can include personalized content on the book pages, the book cover, and the book accessories.

The data center 30 can include one or more servers 32, data storage devices 34 for storing image data, user account and order information, and one or more computer processors 36 for processing orders and rendering digital images. An online-photo website can be powered by the servers 32 to serve as a web interface between the users 70 and the image service provider. The users 70 can order image-based products from the web interface. The printing and finishing facilities 40 and 41 can produce the ordered image-based products such as photographic prints, greeting cards, holiday cards, post cards, photo albums, photo calendars, photo books, photo T-shirt, photo mugs, photo aprons, image recording on compact disks (CDs) or DVDs, and framed photo prints.

The architecture of the data storage devices 34 is designed to optimize the data accessibility, the storage reliability and the cost. Further details on the image data storage in online printing system 20 are provided in the commonly assigned U.S. Pat. No. 6,839,803, titled "Multi-Tier Data Storage System", which is incorporated herein by reference.

The printing and finishing facilities 40 and 41 can be co-located at the data center 30. Alternatively, the printing and finishing facility 40 and 41 can be located remotely from the data center 30. The printing and finishing facilities 40 and 41 can be set up. Each printing and finishing facility 40 or 41 can be geographically located close to a large population of customers to shorten order delivery time. Furthermore, the printing and finishing facilities 40 and 41 and the data center 30 can be operated by different business entities. For example, a first business entity can own the data center 30 and host the website that can be accessed by the users 70. The printing and finishing facilities 40 and 41 can be owned and operated by a second business entity, which can be referred as an Application Service Provider (ASP), responsible for fulfilling the image-based products ordered through at the website.

The printing and finishing facility 40 can include one or more network servers 42, printers 45 for printing images on physical surfaces, finishing equipment 46 for operations after the images are printed, and shipping stations 48 for confirming the completion of the orders and shipping the ordered image-based products to the user 70 or recipients 100 and 105. The one or more network servers 42 can communicate with the data center 30 via the computer network 80 and facilitate the communications between different devices and stations in the printing and finishing facility 40. The computer network 80 can include a Local Area Network, a Wide Area Network, and wireless communication network.

The printers 45 can receive digital image data and control data, and reproduce images on receivers. The receivers can be separate photo prints, or pages to be incorporated into photo books. Examples of the printers 45 include can be digital photographic printers such as Fuji Frontier Minilab printers, Kodak DLS minilab printers, Imaging Solutions CYRA Fast-Print digital photo printer, or Kodak I-Lab photo printers. The printers 45 can include offset digital printers or digital printing presses such as HP Indigo digital printing press, Xerox's iGen printer series, or Eastman Kodak's NexPress digital press, etc. The printers 45 can also include large format photo or inkjet printers for printing posters and banners. The printing and finishing facilities 40 and 41 can include a film processor 43 for processing exposed films, and a scanner 44 for digitizing processed film stripes. The order information and image data can be transferred from servers 32 to the network servers 42 using a standard or a proprietary protocol (FTP, HTTP, among others).

The finishing equipment 46 can perform operations for finishing a complete image-based product other than printing, for example, cutting, folding, adding a cover to photo book, punching, stapling, gluing, binding, envelope printing and sealing, packaging, labeling, package weighing, and postage metering. The finishing operations can also include framing a photo print, recording image data on a CD-ROM and DVD, making photo T-shirts and photo mugs, etc. Furthermore, the printers 45 and the finishing equipments 46 can reside at different locations.

Figure 2:
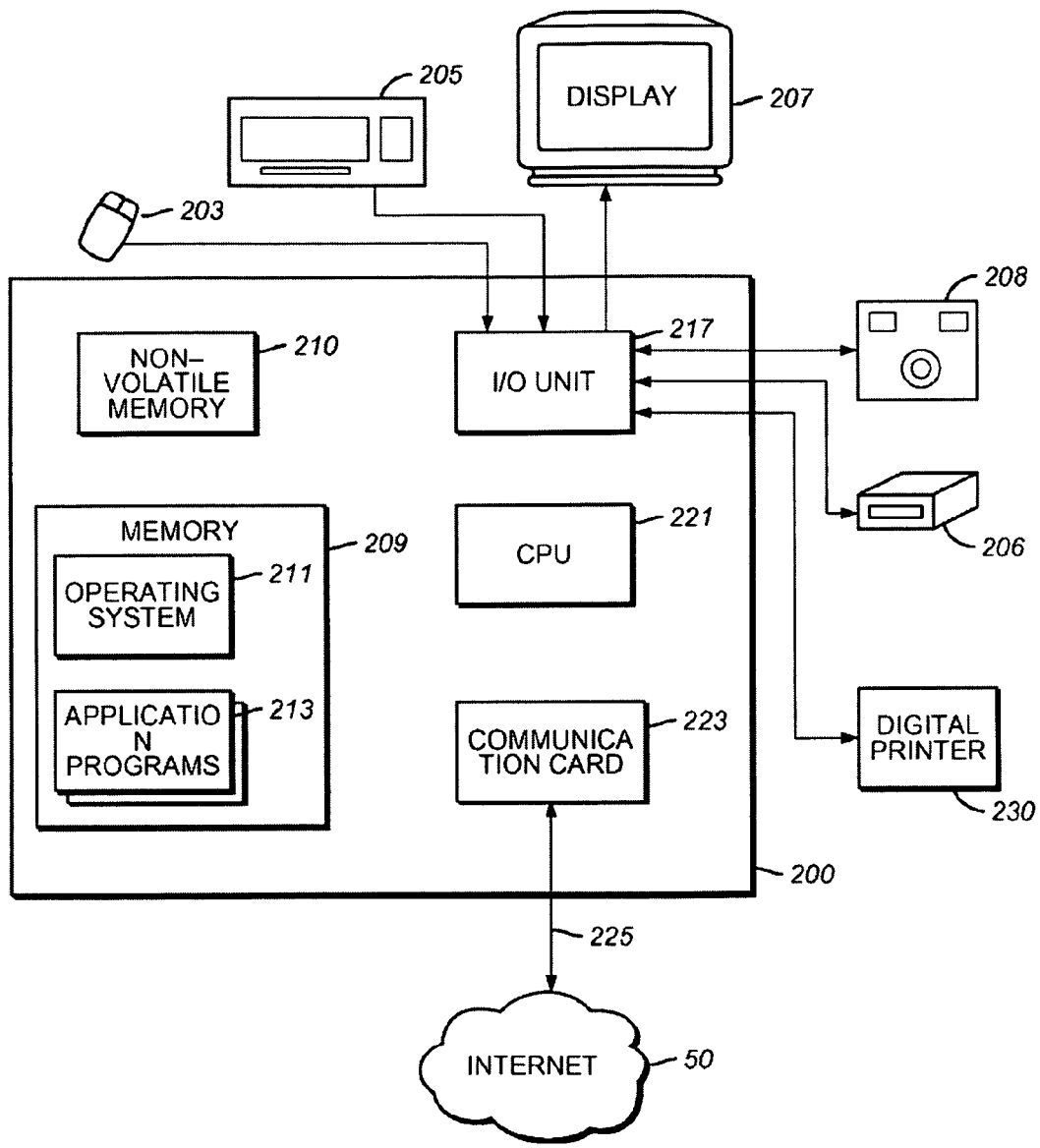
FIG. 2 shows a typical user's computer used with the system of FIG. 1.

A user 70 can access the online-photo website using a computer terminal 60 as shown in FIG. 2. The computer terminal 60 can be a personal computer, a portable computer device, or a public entry terminal such as a kiosk. The computer terminal 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, an T/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a USB memory card, a floppy disk, a CD-ROM, a DVD, or other removable storage media), and a communications device 223 (e.g., a modem or network adapter) for exchanging data with an Internet 50 via a communications link 225 (e.g., a telephone line).

The computer 200 allows the user 70 to communicate with the online-photo website using the wired or wireless communication card or device 223. The user 70 can set up and access her personal account. The user 70 can enter user account information such as the user's name, address, payment information (e.g. a credit card number), and information about the recipient of the image-based products. The user 70 can also enter payment information such as credit card number, the name and address on the credit card etc. The user 70 can upload digital images to the online-photo website. The user can store the images in an online photo album, create personalized image-based product at the web user interface, and order a personal image-based product and a gift product for specified recipients 100 and 105.

The computer 200 can be connected to various peripheral I/O devices such as an image capture device (digital camera, film scanner or reflective scanners). The peripheral device can be a digital camera 208. The digital images captured by a digital camera are typically stored in a memory card or a memory stick (e.g., SmartMedia™ or CompactFlash™) that are detachable from the digital camera. The digital images on the memory card can be transferred to o a non-volatile memory 210 using a card reader 206. The digital camera 208 can also be directly connected to the computer 200 using a Firewire or an USB port, a camera docking station, or a wireless communication port to allow digital images to be transferred from the memory on the detail camera to the computer's disk drive or the non-volatile memory 210.

The user 70 can also obtain digital images from film-based prints from a traditional camera, by sending an exposed film into a photo-finishing service, which develops the film to make prints and/or scans (or otherwise digitizes) the prints or negatives to generate digital image files. The digital image files then can be downloaded by the user or transmitted back to the user by e-mail or on a CD-ROM, diskette, or other removable storage medium. The users can also digitize images from a negative film using a film scanner that is connected to the computer 200 or from a reflective image print using a scanner. Digital images can also be created or edited using an image software application 213 such as Adobe Photoshop.

Once the digital images are stored on the computer 200, a user can perform various operations on the digital images using application programs 213 stored in memory 209. For example, an image viewer application can be used for viewing the images and a photo editor application can be used for touching up and modifying the images. An electronic messaging (e.g., e-mail) application can be used to transmit the digital images to other users. The application programs 213 can also enable the user 210 to create a personalized image-based product on the computer 200. Several of the above described imaging functions can be incorporated in a client software application that can be installed on a user's computer 200.

In addition to viewing the digital images on the computer display 207, the user 70 may desire to have physical image-based products made of digital images. Prints can be generated by the user 70 using a digital printer 230 that is connected to the computer 200. Typical digital printers 230 can include such as an inkjet printer or a dye sublimation printer. The user 70 can also purchase image-based products from the online image service provider. The production of these image-based products often require the use of commercial equipment which are usually only available at a commercial production location such as the printing and finishing facilities 40 and 41. An example for the online image service providers is Shutterfly, Inc., located at Redwood City, Calif.

The user 70 can be a consumer that accesses the computer terminal 60 from home or a public entry terminal. The user 70 can also be a business owner or employee that may access the computer terminal 60 at a retail location such as a photo shop or a printing store. The disclosed system is compatible with a retail imaging service using a local computer 200 at the point of sales, or an online printing system wherein a user 70 access a server 32 using a remote computer terminal 60. The formats of communication between the computer terminal 60 and the servers 32 as well as the graphic user interface can be customized for the consumer and commercial customers.

The computer terminal 60 can also be a public entry terminal such as a kiosk for receiving digital image data from the user 70 and uploading the digital images to the server 32. After the digital image files have been uploaded, the user can view, manipulate and/or order prints in the manners described above. The public entry terminal can also support various electronic payment and authorization mechanisms, for example, a credit or debit card reader in communication with a payment authorization center, to enable users to be charged, and pay for, their prints at the time of ordering.

An exemplified process of using the online image service can include the following. The user 70 sends digital images to the servers 32 provided by the online printing system 20 by uploading over the Internet 50 using a standard or a proprietary protocol (FTP, HTTP, XML, for example) or electronic communication application (for example, e-mail or special-purpose software provided by the photo-finisher). The user 70 can also send digital image data stored on an electronic storage medium such as a memory card or recordable CD by US mail, overnight courier or local delivery service. The photo-finisher can then read the images from the storage medium and return it to the user, potentially in the same package as the user's print order. The image service provider can load data or programs for the user's benefit onto the storage medium before returning it to the user. For example, the photo-finisher can load the storage medium with an application program 213 for the user to create a personalized image-based product on his computer 200.

The user 70 can also send a roll of exposed film, and processed film negatives to the image service provider. The exposed film is processed by the film processor 43 and digitized by the scanner 44 in the printing and finishing facilities 40 and 41. The digital image data output from the scanner 44 is stored on the data storage 34.

After the image service provider has received the user's digital images, the image service provider can host the images on the online photo website, at which the user can view and access the images using a web browser or a locally installed software application. The user 70 can access the online-photo website to create and design a photo-based product such as a photo book and a photo greeting card, and specify the images to be reproduced on an image-based product and parameters relating to printing (e.g., finish, size, number of copies). The user 70 can also designate one or more recipients 100 and 105 to whom the image-based products are to be sent.

After the user's images have reached the image service provider and have been made available online, the user can place an order with the image service provider. One way to place an order is by having the user 70 view the images online, for example, with a browser and selectively designate which images should be printed. The user can also specify one or more recipients 100 and 105 to whom prints should be distributed and, further, print parameters for each of the individual recipients, for example, not only parameters such as the size, number of copies and print finish, but potentially also custom messages to be printed on the back or front of a print. The user 70 can also authorize a recipient 110 to receive the user's images electronically by entering the recipient 110's email address and other electronic identifications.

The information entered by the user 70 can be stored on the server 32 and the data storage 34, and subsequently transmitted to a printing and finishing facility 40 or 41 for making the image-based products. The image-based products can include photographic prints, but also any other item to which graphical information can be imparted, for example, greeting or holiday cards, books, greeting cards, playing cards, T-shirts, coffee mugs, mouse pads, key-chains, photo collectors, photo coasters, or other types of photo gift or novelty item. The image-based products are printed by the printer 45 and finished by finishing equipment 46 according to the printing parameters as specified by the user 70. The image-based products are then delivered to the specified recipients 100 and 105 using standard U.S. Mail, or courier services such as Federal Express and UPS.

Figure 3:
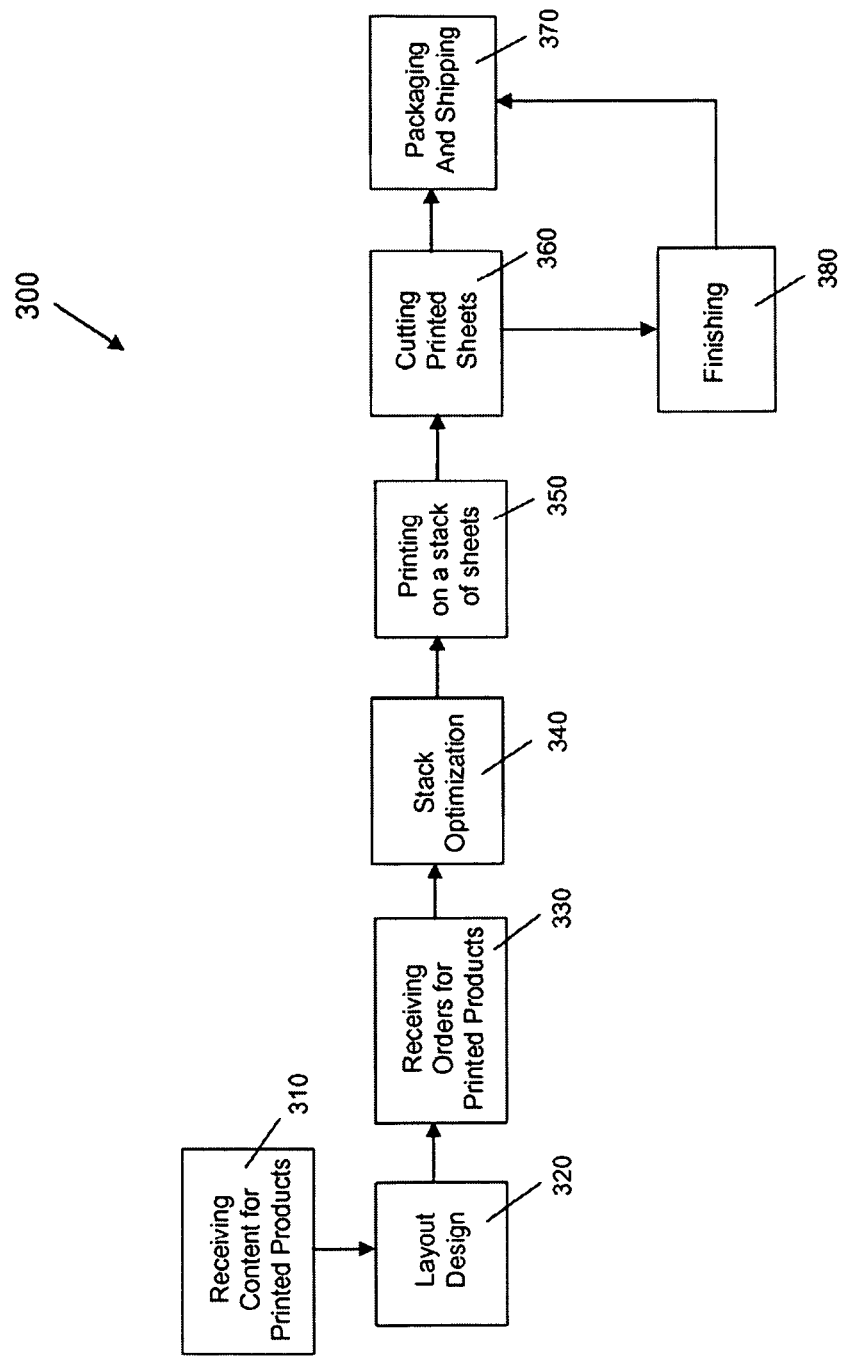
FIG. 3 illustrates an exemplified flow diagram for manufacturing printing sheet products.

Referring to FIG. 3, an exemplified manufacturing workflow 300 for printing page products includes the following steps. Content for printed products are first received from a user (step 310) by a printing finishing facility 40 in the online printing system 20, a local printing shop, and a retail location. The content can include text, images, page layout, background of a page, designs, styles, etc. The content can also include selections of text, images, and designs already stored at the printing finishing facility 40. The content can be licensed from a third party by the user or a business entity associated with the printing finishing facility 40. The user then designs layouts of the printed products using the content (step 320). The printed products include one or more printed page(s) based on the content received from the user. Example of the printed products include brochures, pamphlets, printed pages insertable to a binder, calendars, posters, books, photo books, product data sheets, book marks, and various types cards such as folded greeting cards, post cards, note cards, and flat holiday cards. Some printed products can be in the form of single pages (e.g. posters, flat post cards, and flat holiday cards, product data sheets, and printed pages). A single-page printed product can be formed by cutting from a large printed page to its final dimension. Some printed products include a collection of printed pages that need to be assembled by finishing operations such as sheet cutting, folding, gluing, threading, etc.

The layout design (step 320) can include the selection of text, font type and size of the text, image, sizes and locations of the images and text, background design, templates, and colors of the text and images. Orders for printed products are next received by the printing finishing facility 40 (step 330). Each order includes one or more printed pages that incorporate the content submitted by a user.

Figure 4:
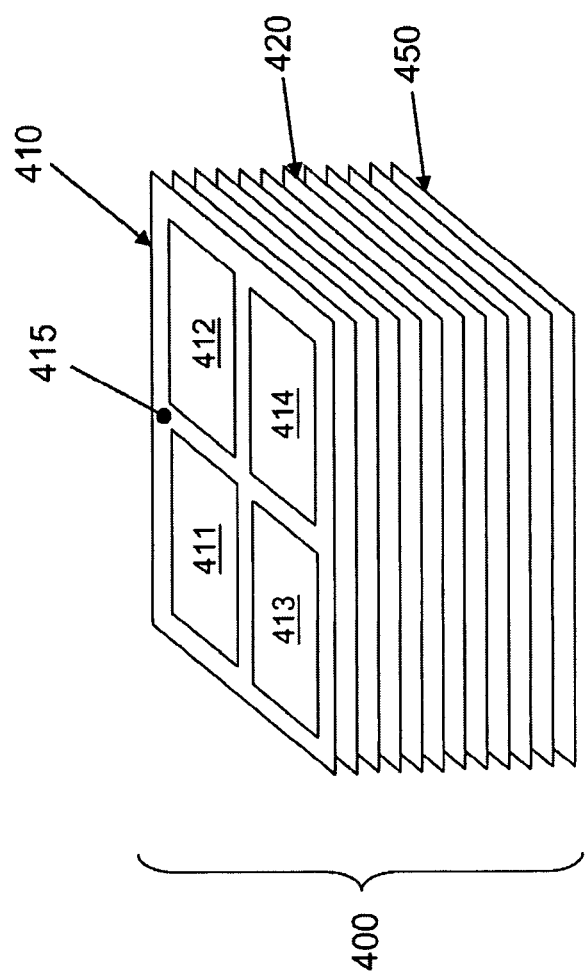
FIG. 4 illustrates a stack of printed sheets before cutting.

For efficiency reasons, referring to FIG. 4, several printed pages to be incorporated into a printed product can be printed on a large sheet 410. A number of sheets 410 can be stacked into a stack 400. The stack 400 can include printed pages from a plurality of orders. For example, the sheet 410 can be 16" wide and 22" long. The printed product can be greeting cards that are 7" wide and 10" long (which can be folded into a 5" by 7" card after printing). Multiple images of printed pages are printed on a sheet 410 in the stack 400 (step 350). For example, four card images 411-414 can be printed on a single sheet 410. The images 411-414 can be slightly larger than the 7" by 10" final card dimensions. The long dimensions of the card image 411-414 can be aligned with the long dimension of the sheet 410. The short dimensions of the card images 411-414 can be aligned with the short dimension of the sheet 410. The sheet 410 can include margins 415 between the card images 411-414 and along the edges of the sheet 410. For producing cards with double-sided printed images, the sheet 410 can be printed double-side with another set of card images printed on the back side. The card images on the two sides of the sheet 410 are registered in their locations on the sheet 410. The card images 411-414 in different sheets 410 can be aligned in separate columns such that they can be cut into different card stacks as described below.

A stack 400 of sheets 410 are typically printed in a batch by a printer or a printing press. The sheets 410 are typically stacked in an output tray of the printer or the printing press. Each stack 400 usually includes printed pages from a plurality of orders each of which may have different number of printed pages. The arrangement of the printed pages in the stack needs to be optimized before printing to minimize paper waste (step 340), as described in detail below.

Figure 5:
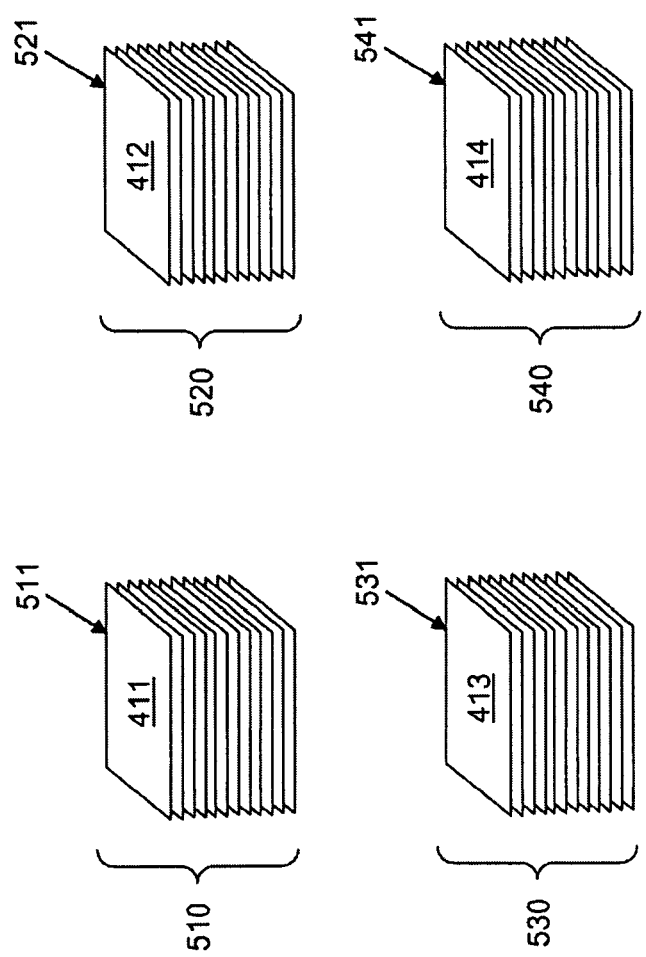
FIG. 5 illustrates stacks of printed pages cut from a stack of printed sheets.

After the stack 400 of sheets 410 is printed, the stack 400 is cut along the borders of the card images 411-414 (step 360). The margins 415 are discarded. Four stacks 510, 520, 530, 540 of printed pages, as shown in FIG. 5, are produced. The stack 510 contains individual printed pages 511. Similarly, the stacks 520, 530, and 540 respectively contain printed pages 521, 531, 541. The printed pages 511, 521, 531, 541 respectively carry card image 411, 412, 413, and 414 printed on the sheets 410 as described above. Each stack 510, 520, 530, or 540 is separated into different orders, and packaged and shipped directly (step 370). Each order can include one or more greeting cards. The printed pages 511, 521, 531, 541 can also be scored and folded in one or more finishing steps (step 380) to form folded cards before they are packaged and shipped. For example, a printed page 511, 521, 531, 541 can 10"×7" that can be folded into 5" by 7" folded card. The recipient of the order can be the same or different from the user who sent in the content, or submitted the order.

While the above described process allows a large number of printed pages to be efficiently printed and cut in a batch, it can also generate a significant amount of paper waste, because each card stack 510, 520, 530, or 540 can include significant number of unpainted pages. The card orders are usually broken into subbatches. The maximum card number in a card subbatch is determined by the number of sheets 410 in the stack 400. For example, the maximum number of sheets 410 in the stack 400 can be set to 51, which may be determined, for example, by ease of cutting the stack by a cutter. The maximum number of cards in a card subbatch is therefore also 51. A card order containing 61 cards is thus separated into two smaller subbatches such as 51 and 10. The two subbatches of 51 and 10 cards need to printed in different card stacks 511, 521, 531, and 541, and re-assembled into a single card stack after cutting (normally before folding) so they can be shipped together as an order.

The card stacks 510, 520, 530, and 540 have the same number of pages (most are printed but some may be unprinted or blank) because the card stacks 510, 520, 530, and 540 are made from the same stack 400. Each card stack 510, 520, 530, or 540 is formed by card subbatches that can have different numbers of cards. A card stack 510, 520, 530, or 540 does not have unprinted pages if the total number of cards (that can be from one or more subbatches) in that card stack matches the number of pages in that stack (which also equals to the number of sheets in the stack 400). In some situations, one or more pages in a card stack 510, 520, 530, or 540 are not printed, if the total number of cards in the card stack is smaller than the number of printed pages in that card stack. The blank or unprinted printed pages represent a waste in the manufacturing process.

The optimization of the card stacks (step 340) is now described using the above example of card printing. In the present invention, a job or printing job refers to a group of subbatches to be printed together. To create a printing job, card subbatches need to be assigned to form different columns in a stack of sheets. Card orders having more than 51 cards are first separated into card subbatches smaller than or equal to 51. In one example, a series of card subbatches having the following number of cards can be generated:

9, 51, 51, 51, 51, 51, 51, 18, 15, 51, 41, 51, 47, 50, 4, 51, 51, 49, 51, 9, 10, 50

An exemplified solution for the stack separation results in a job having 215 sheets (410) that contains five stacks respectively comprising 51, 51, 51, 50, and 12 sheets:

| Stack Size: | 51 | 51 | 51 | 50 | 12 | |
|---|---|---|---|---|---|---|
| A Stack: | 51, | 51, | 51, | 49, | 10 | [212 cards in 5 subbtches, 3 blanks] |
| B Stack: | 51, | 51, | 51, | 47 + 3 | 12 | [215 cards in 5 subbtches, no blanks] |
| C Stack: | 51, | 51, | 51, | 41 + 9 | 9 | [212 cards in 5 subbtches, 3 blanks] |
| D Stack: | 51, | 51, | 50, | 50 + 1, | 3 + 9 | [211 cards in 6 subbtches, no blanks] |

The subbatches are moved around from the original chronicle sequence to balance the sizes of the stacks. The fourth and the fifth stack size are respectively reduced to 50 and 12 sheets to minimize blank pages. The subbatch containing 15 cards is s divided into 3 and 12 cards in two separate stacks. Similarly, the subbatch containing 18 cards is divided into 9 and 9 cards in two separate stacks. The subbatch containing 4 card sheets is divided into 3 and 1 card in two separate stacks.

The maximum stack number is determined by the column (or stack) that has the most items. For example, for the fifth stack comprising 10, 12, 9 (3+9) in the four stacks, the maximum stack size is 12. The above s exemplified solution resulted in 6 un-printed or wasted pages.

The separation of each series of card subbatches usually has multiple solutions. A worst stack separation can have 51 printed pages in A Stack and all blank pages for B Stack, C Stack, and D Stacks.

A systematic approach is thus needed to seek for the solution producing the least number of blank pages. A "stack-balancing" algorithm installed on a computer at the printing finishing facility 40 or 41 attempts to separate them into four stacks (A, B, C, and D) corresponding to card stacks 511, 521, 531 and 541. The maximum number of sheets for each stack can be 51. To fulfill these card orders at the lower paper waste, the algorithm attempts to separate the stacks to have stack sizes as equal as possible, to reduce paper waste.

Figure 6:
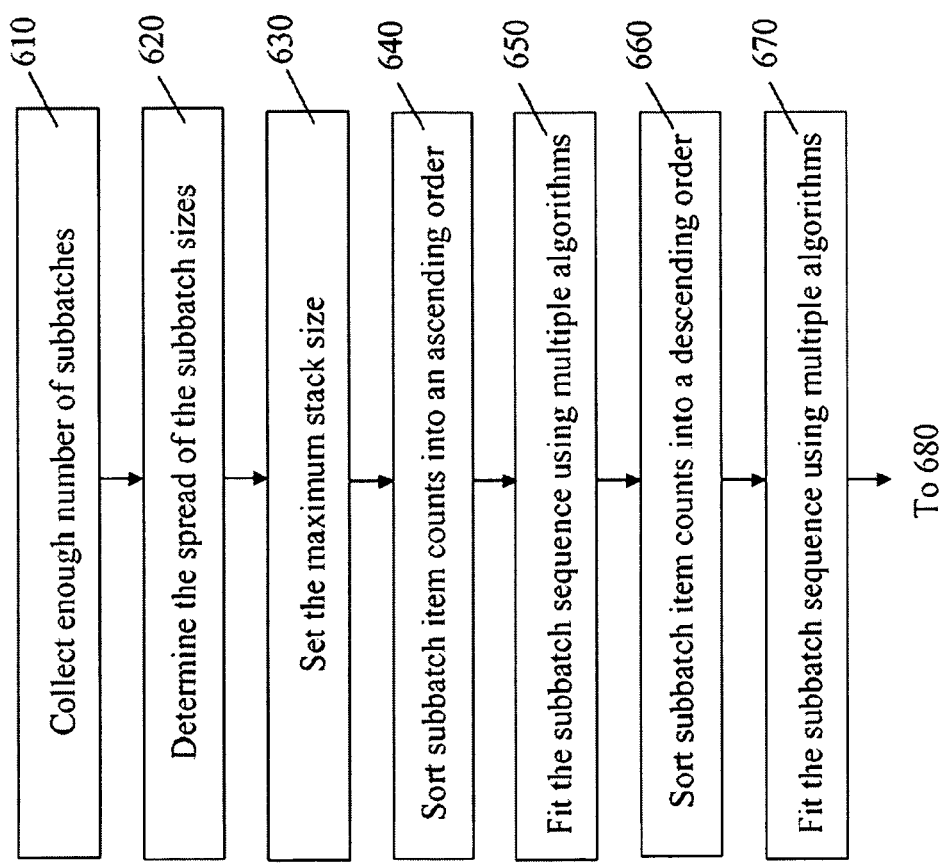
FIGS. 6 and 7 illustrate an exemplified flow diagram for optimizing a stack of printed sheets.
Figure 7:
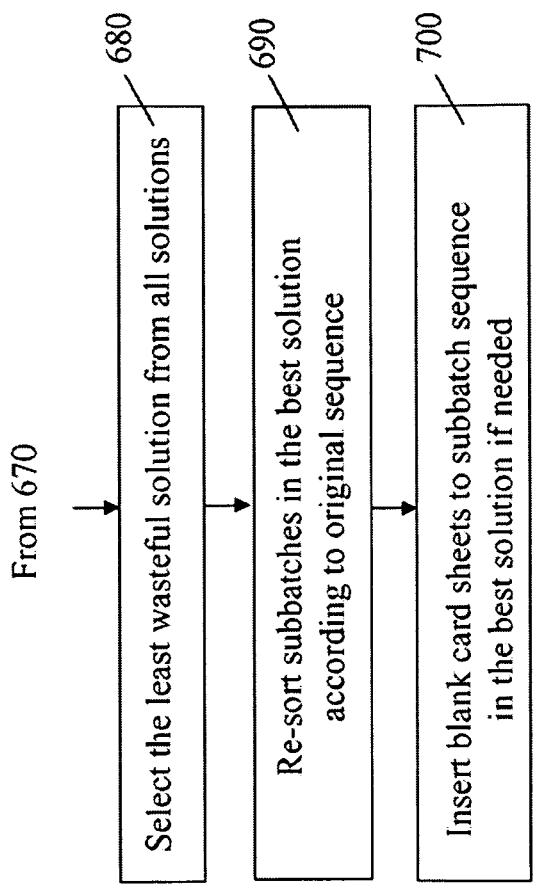

Referring to FIGS. 6 and 7, the "stack-balancing" algorithm can include one or more of the following steps:

Collect enough number of subbatches to above a minimum number of total cards (step 610). For the example of card printing described above and illustrated in FIGS. 4 and 5, at least four card subbatches are needed to have four card images printed on a sheet 410. Unique item counts are defined by the number of unique values in the list of subbatch item counts to balance. For example, the group of subbatches respectively having 10, 15, 18, 18, and 10 printed pages has three unique item counts (10, 15, 18).

A possible reduced stack size is next determined based on the difference between the two largest subbatch item counts found in the job (step 620). If second to largest item count is less then 65% of largest then the largest is moved to the next job. For example: if the item counts in a group of subbatches are 1, 3, 5, 8, 11, 51 then 51 is skipped and the maximum stack size calculated will be 11. If item counts are 1, 3, 5, 8, 11, 46, 51 then maximum size will be 51. This step makes item counts more evenly distributed among subbatches, thus giving a better chance for balanced distribution between different columns of printed pages in the stack 400 or more balanced stacks 510-540.

The maximum stack size is next set to the maximum using one of the following two methods (step 630):
a) A sum of all item counts divided by the number of stacks.
b) The largest item count in any one subbatch as determined in the step 620.

Example item counts and calculated stack size if there are 4 stacks (e.g. 510, 520 530, 540):

For item counts of 51, 48, 2, 1, 8, the maximum stack size is set to 51 using Method b).

10, 15, 18, 17, 12, 15, 16, 3, 2 has a total of 108 items. The maximum stack size is set to be 108/4=27 using Method a).

Next, subbatches are sorted into a sequence having ascending item counts (step 640). For example, 1, 15, 19, 20, 20, 20, 20, 21, 23, 50, 51, 51, 51, 51.

A multiple of algorithms are then used to search for solutions using the sorted item counts and the max stack size (step 650) before a least wasteful solution is selected. The First Fit, Best Fit, Worst Fit, and Almost Worst Fit are the conventional names used for fitting similar types of problems. Each of the algorithms will be described using the above example of subbatch sequence: 1, 15, 19, 20, 20, 20, 20, 21, 23, 50, 51, 51, 51, 51. The maximum stack size is 104 using method b) described above.

First Fit

Key steps of this algorithm include one or more of the following steps:

Assigns item count to the first stack that still has room.
Assigns each subbatch item count to the first stack that still has room.
For each integer item count:
Check if it will fit on the first stack. Stop if it fits and assign to that stack. If will not fit, try the next stack. If it fits the next stack, stop and assign it to that stack.
Repeat until out of stacks. If it will not fit on any stack the item count is skipped.
The First Fit solution gives
A Stack: 1, 15, 19, 20, 20, 20 [95]
B Stack: 20, 21, 23 [64]
C Stack: 50, 51 [101]
D Stack: 51, 51 [102]
The sums in the stacks are shown above in brackets [ ]
Skipped: 51[51]
Number of blank pages (waste): 46.

Best Fit

Key steps of this algorithm include one or more of the following steps:

Assign item count to the fullest stack that still has room.
Assign each subbatch item count to the fullest stack that still has room.
For each integer item count:
Add value to all stack sizes and select the one with the greatest value that does not exceed the maximum size allowed.
If it will not fit on any stack the item count is skipped.
The Best Fit solution gives
A Stack: 1, 15, 19, 20, 20, 20 [95]
B Stack: 20, 21, 23 [64]
C Stack: 50, 51 [101]
D Stack: 51, 51 [102]
The sums in the stacks are shown above in brackets [ ].
Skipped: 51 [51]
Number of blank pages (waste): 46.

Almost Worst Fit

Key steps of this algorithm include one or more of the following steps:

Assigns item count to the second emptiest stack that still has room.
For each integer item count:
Sort stack sizes by current sum values in descending order (emptiest first). Assign to second stack if it fits;
if it does not fit, assign to first stack. If it does not fit on first or second stack, the item count is skipped.
The Almost Worst Fit solution gives
A Stack: 1, 20, 20, 50 [91]
B Stack: 15, 20, 21 [56]
C Stack: 19, 20, 23 [62]
D Stack: 51, 51 [102]
The sums in the stacks are shown above in brackets [ ].
Skipped: 51, 51 [102]
Number of blank pages (waste): 97.

Worst Fit

Key steps of this algorithm include one or more of the following steps:

Assigns item count to the emptiest stack that still has room.
For each integer item count:
Add value to all stack sizes and select the one with the smallest value that does not exceed the maximum size allowed.
If it will not fit on any stack the item count is skipped.
The Worst Fit solution gives
A Stack: 1, 20, 23, 51 [95]
B Stack: 15, 20, 50 [85]
C Stack: 19, 20, 51 [90]
D Stack: 20, 21, 51 [92]
The sums in the stacks are shown above in brackets [ ].
Skipped: 51 [51]
Number of blank pages (waste): 18.

After sorting solutions are found using the algorithms as described above, the same subbatches are sorted into a sequence having descending item counts (step 660):

51, 51, 51, 51, 50, 23, 21, 20, 20, 20, 20, 19, 15, 1 (step 660).

The same algorithms are then used to search for a solution for subbatch sequence having ascending order (step 670). The following solutions are obtained using the above described fitting algorithms:

Best Fit:
A Stack: 51, 51, 1 [103]
B Stack: 51, 51 [102]
C Stack: 50, 23, 21 [94]
D Stack: 20, 20, 20, 20, 19 [99]
Waste: 14
Skipped: 15 [15]

First Fit:
A Stack: 51, 51, 1 [103]
B Stack: 51, 51 [102]
C Stack: 50, 23, 21 [94]
D Stack: 20, 20, 20, 20, 19 [99]
Wastes: 14
Skipped: 15 [15]

Worst Fit:
A Stack: 51, 50 [101]
B Stack: 51, 23, 20 [94]
C Stack: 51, 21, 20 [92]
D Stack: 51, 20, 20, 1 [92]
Waste: 25
Skipped: 19, 15 [34]

Almost Worst Fit:
A Stack: 51, 51 [102]
B Stack: 51, 50 [101]
C Stack: 51, 23, 21 [95]
D Stack: 20, 20, 20, 20, 19, 1 [100]
Waste: 10
Skipped: 15 [15]

Select the least wasteful solution from all solutions (step 680). The solution with the least blank cards is selected. In the above described example, the least wasteful solution was found when Almost Worst Fit is applied to subbatches sorted in descending item counts.

The subbatches in each stack in the least wasteful solution are sequenced back in accordance to the original subbatch sequence they were received (i.e. according to First-In-First-Out (FIFO) of the printing orders) (step 690), which can improve efficiency of finishing and shipping. Lastly, blank pages are inserted to fill each card stack to the same stack size, as needed, and combine back into one stack (step 700).

It is understood that the described system and methods can be implemented in various forms without deviating from the spirit of the specification. For instance, each sheet in a stack can include two, three, four, five, six, and other number of printed images, which can be cut into same number of stacks. The maximum number of sheets in a stack can be different from 51. For example, the maximum number of sheets in a stack can be a number higher than 10, 20, 30, 40, or 50. The pages in different stacks can have different sizes. Each printed image corresponds to a single printable item such a card, a page in a calendar or a book, etc. The described system and methods are compatible with different printing equipment: digital printing press, lithographic printing press, laser printing, ink jet printing, photographic printing, thermal printing, and thermal dye sublimation printing.

What is claimed is:

1. A method for manufacturing printed page products, comprising:
   defining, by a computer system, a plurality of subbatches each comprising one or more pages each associated with a layout to be printed by a printing device;
   storing a predetermined natural number M that is associated with the maximum number of sheets to be fed in a stack to the printing device;
   assigning, by the computer system, the plurality of subbatches to N groups while keeping the pages in each of the N groups no more than M pages, wherein N is a natural number;
   arranging the plurality of subbatches among the N groups to minimize the difference between the total number of pages in the N groups and M×N;
   receiving a stack of sheets by a printing device; and
   printing the layouts for the one or more pages in the plurality of subbatches in the stack of sheets, wherein pages from the N groups are respectively positioned in N columns in the stack of sheets.

2. The method of claim 1, further comprising:
   cutting the stack of sheets into N stacks of sheets each comprising pages from one of the N columns.

3. The method of claim 1, wherein the step of assigning comprises:
   if one of the plurality of subbatches has more than M number of pages, breaking the one of the plurality of subbatches into at least two subbatches; and
   assigning the at least two subbatches to two different groups in the N groups.

4. The method of claim 1, wherein the layouts in at least one of the N columns have the same dimensions.

5. The method of claim 1, wherein the N groups have different numbers of pages, the method further comprising:
   inserting blank pages into one or more of the N groups to make the N groups to have the same number of pages.

6. The method of claim 1, wherein the step of assigning comprises:
   defining a fullest group in the N group, wherein the fullest group includes the most number of pages among the N groups; and
   assigning subbatches in the plurality of subbatches to minimize the difference between M and the number of pages in the fullest group.

7. The method of claim 1, wherein the layouts for the one or more pages on the plurality of subbatches include content received from a user.

8. The method of claim 7, further comprising:
   receiving the content from the user over a computer network.

9. The method of claim 1, wherein N is selected from the group consisting of two, three, four, five, and six.

10. The method of claim 1, wherein M is bigger than 10.

11. The method of claim 1, wherein the step of assigning comprises:
    minimizing the differences in the numbers of pages between different groups in the N groups.

12. The method of claim 1, wherein the step of assigning comprises:
    assigning a portion of the plurality of subbatches into the N groups;
    identifying an unassigned subbatch in the plurality of subbatches, wherein the unassigned subbatch is not yet assigned to any of the N groups;
    selecting one of the N groups; and
    assigning the unassigned subbatch into one of the N groups while keeping the number of pages in the one of the N groups equal or less than M.

13. The method of claim 1, wherein the step of assigning comprises:
    assigning a portion of the plurality of subbatches into the N groups;
    determining an emptiest group in the N group, wherein the emptiest group includes the least number of pages in its associated subbatches;
    identifying an unassigned subbatch in the plurality of subbatches, wherein the unassigned subbatch is not yet assigned to any of the N groups; and
    assigning the unassigned subbatch into the emptiest group while keeping the number of pages in the emptiest group equal or less than M.

14. A method for manufacturing printed page products, comprising:
    defining, by a computer system, a plurality of subbatches each comprising one or more pages each associated with a layout to be printed by a printing device;
    storing a predetermined natural number M that is associated with the maximum number of sheets to be fed in a stack to the printing device;
    assigning, by the computer system, a first group of subbatches in the plurality of subbatches to a first N groups while keeping the pages in each of the first N groups no more than M pages, wherein N is a natural number;
    assigning, by the computer system, a second group of subbatches in the plurality of subbatches to a second N groups while keeping the pages in each of the second N groups no more than M pages;
    arranging the first group of subbatches and the second group of subbatches among the first N groups and the second N groups to minimize the difference between the total number of pages in the first N groups and M×N and to minimize the difference between the total number of pages in the first N groups and M×N;
    printing the layouts for the pages in the first N groups in a first stack of sheets, wherein pages from the first N groups are respectively positioned in first N columns in the first stack of sheets; and
    printing the layouts for the pages in the second N groups in a second stack of sheets, wherein pages from the second N groups are respectively positioned in second N columns in the second stack of sheets.

* * * * *